United States Patent
Ma et al.

(10) Patent No.: US 10,976,594 B2
(45) Date of Patent: Apr. 13, 2021

(54) LIGHT GUIDE PLATE, LIGHT SOURCE ASSEMBLY, DISPLAY PANEL AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Junjie Ma, Beijing (CN); Zhen Wang, Beijing (CN); Jian Sang, Beijing (CN); Haiwei Sun, Beijing (CN); Mang Fu, Beijing (CN); Gongtao Zhang, Beijing (CN); Shubai Zhang, Beijing (CN); Jianbiao Ding, Beijing (CN); Zhonghua Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/394,258

(22) Filed: Apr. 25, 2019

(65) Prior Publication Data
US 2019/0331958 A1 Oct. 31, 2019

(30) Foreign Application Priority Data
Apr. 28, 2018 (CN) .......................... 201810400389.7

(51) Int. Cl.
G02F 1/1335 (2006.01)
F21V 8/00 (2006.01)
G02F 1/13357 (2006.01)

(52) U.S. Cl.
CPC ..... *G02F 1/133524* (2013.01); *G02B 6/0045* (2013.01); *G02F 1/133606* (2013.01)

(58) Field of Classification Search
CPC ......... G02F 1/133524; G02F 1/133606; G02B 6/0045
(Continued)

(56) References Cited

U.S. PATENT DOCUMENTS

| | | | |
|---|---|---|---|
| 2011/0103091 A1 | 5/2011 | Kunimochi et al. | |
| 2014/0185321 A1* | 7/2014 | Chang | G02B 6/002 362/611 |

(Continued)

FOREIGN PATENT DOCUMENTS

| | | |
|---|---|---|
| CN | 103399370 A | 11/2013 |
| CN | 104896373 A | 9/2015 |

(Continued)

OTHER PUBLICATIONS

First Chinese Office Action dated Jul. 30, 2019.

*Primary Examiner* — Nathanael R Briggs
*Assistant Examiner* — William D Peterson
(74) *Attorney, Agent, or Firm* — Dilworth & Barrese, LLP.; Michael J. Musella, Esq.

(57) ABSTRACT

A light guide plate, a light source assembly, a display panel and a display device are provided. The light guide plate includes a light-emitting surface, a bottom surface opposite to the light-emitting surface and a light-entering surface intersecting with the light-emitting surface and the bottom surface; at least one of the light-emitting surface of the light guide plate and the bottom surface of the light guide plate includes a horizontal portion and an inclined portion protruding out of a plane where the horizontal portion is located along a direction away from both of the light-emitting surface and the bottom surface; the inclined portion is at an (Continued)

end, which is close to the light-entering surface, of the light guide plate, and the inclined portion has an included angle with respect to the horizontal portion.

17 Claims, 8 Drawing Sheets

(58) Field of Classification Search
USPC .......................................................... 349/62
See application file for complete search history.

(56) References Cited

U.S. PATENT DOCUMENTS

2016/0109639 A1* 4/2016 Kurata ................. G02B 6/0038
                                                                 349/65
2017/0168222 A1* 6/2017 Chen .................... G02B 6/0068

FOREIGN PATENT DOCUMENTS

| CN | 206479662 A | 9/2017 |
|---|---|---|
| TW | 201250349 A | 12/2012 |

\* cited by examiner

LIGHT GUIDE PLATE, LIGHT SOURCE ASSEMBLY, DISPLAY PANEL AND DISPLAY DEVICE

The application claims priority to the Chinese patent application No. 201810400389.7, filed on Apr. 28, 2018, the entire disclosure of which is incorporated herein by reference as part of the present application.

TECHNICAL FIELD

At least one embodiment of the present disclosure relates to a light guide plate, a light source assembly, a display panel and a display device.

BACKGROUND

With developments of display technology, people are pursuing more and more narrow borders of display devices. A backlight structure of a display device generally includes a light guide plate, a mold frame, a back plate, a light source, a component for fixing the light source, and a light shielding tape, etc. In general, in a display device including a backlight structure of side-in type, it is required that an appropriate distance is between a light-emitting surface of a light-emitting portion of the backlight structure and an edge, which is close to the light-emitting portion, of a display region, so that the light guide plate provides uniform light for a display panel.

SUMMARY

At least one embodiment of the present disclosure provides a light guide plate, the light guide plate comprises a light-emitting surface, a bottom surface opposite to the light-emitting surface and a light-entering surface intersecting with the light-emitting surface and the bottom surface; at least one of the light-emitting surface of the light guide plate and the bottom surface of the light guide plate comprises a horizontal portion and an inclined portion protruding out of a plane where the horizontal portion is located along a direction away from both of the light-emitting surface and the bottom surface; the inclined portion is at an end, which is close to the light-entering surface, of the light guide plate, and the inclined portion has an included angle with respect to the horizontal portion.

For example, in the light guide plate provided by at least one embodiment of the present disclosure, the light-emitting surface comprises the horizontal portion and the inclined portion, and the bottom surface is parallel to the horizontal portion of the light-emitting surface.

For example, in the light guide plate provided by at least one embodiment of the present disclosure, the bottom surface comprises the horizontal portion and the inclined portion, and the light-emitting surface is parallel to the horizontal portion of the bottom surface.

For example, in the light guide plate provided by at least one embodiment of the present disclosure, both the light-emitting surface and the bottom surface comprise the horizontal portion and the inclined portion, and the horizontal portion of the light-emitting surface is parallel to the horizontal portion of the bottom surface.

For example, in the light guide plate provided by at least one embodiment of the present disclosure, the inclined portion of the bottom surface comprises one inclined surface, and the inclined surface has the included angle with respect to the horizontal portion of the bottom surface.

For example, in the light guide plate provided by at least one embodiment of the present disclosure, the inclined portion of the bottom surface comprises a plurality of serrated structures, and each of the plurality of serrated structures comprises one inclined surface; included angles respectively between the inclined surfaces of the plurality of serrated structures and the horizontal portion of the bottom surface of the light guide plate are same with each other.

For example, in the light guide plate provided by at least one embodiment of the present disclosure, the inclined portion of the bottom surface comprises a plurality of serrated structures, and each of the plurality of serrated structures comprises one inclined surface; and along a direction from a position close to the light-entering surface of the light guide plate to a position away from the light-entering surface of the light guide plate, included angles respectively between the inclined surfaces of the plurality of serrated structures and the horizontal portion of the bottom surface increase gradually.

For example, in the light guide plate provided by at least one embodiment of the present disclosure, the inclined portion of the light-emitting surface comprises one inclined surface, and the inclined surface has the included angle with respect to the horizontal portion of the light-emitting surface.

For example, in the light guide plate provided by at least one embodiment of the present disclosure, the inclined portion of the light-emitting surface comprises a plurality of serrated structures, and each of the plurality of serrated structures comprises one inclined surface; included angles respectively between the inclined surfaces of the plurality of serrated structures and the horizontal portion of the light-emitting surface are same with each other.

For example, in the light guide plate provided by at least one embodiment of the present disclosure, the inclined portion of the light-emitting surface comprises a plurality of serrated structures, and each of the plurality of serrated structures comprises one inclined surface; along a direction from a position close to the light-entering surface of the light guide plate to a position away from the light-entering surface of the light guide plate, included angles respectively between the inclined surfaces of the plurality of serrated structures and the horizontal portion of the light-emitting surface of the light guide plate increase gradually.

For example, in the light guide plate provided by at least one embodiment of the present disclosure, a value of the included angle is 1°~3°.

For example, in the light guide plate provided by at least one embodiment of the present disclosure, a length, along a direction from a position close to the light-entering surface of the light guide plate to a position away from the light-entering surface of the light guide plate, of the inclined surface is greater than 100 μm.

For example, in the light guide plate provided by at least one embodiment of the present disclosure, along a direction from a position close to the light-entering surface of the light guide plate to a position away from the light-entering surface of the light guide plate, a vertical distance between the inclined portion and the plane where the horizontal portion is located decrease gradually.

For example, in the light guide plate provided by at least one embodiment of the present disclosure, the horizontal portion is at a side, which is away from the light-entering surface of the light guide plate, of the inclined portion.

At least one embodiment of the present disclosure further provides a light source assembly, and the light source assembly comprises any one of the light guide plates provided by the embodiments of the present disclosure.

For example, the light source assembly provided by at least one embodiment of the present disclosure further comprises a light-emitting portion facing the light-entering surface of the light guide plate so that light emitted by the light-emitting portion enters the light-entering surface of the light guide plate; the inclined portion of the light guide plate is at a side, which is close to the light-emitting portion, of the horizontal portion of the light guide plate.

For example, in the light source assembly provided by at least one embodiment of the present disclosure, the light-emitting portion comprises a base and a light-emitting element, the light-emitting element is fixed on the base, a portion of the base covers an end, which is close to the light-emitting portion, of the light-emitting surface of the light guide plate, and the base is lightproof.

At least one embodiment of the present disclosure further provides a display panel, and the display panel comprises any one of the light source assemblies provided by the embodiments of the present disclosure.

For example, the display panel provided by at least one embodiment of the present disclosure further comprises a display region; the inclined portion of the light guide plate does not overlap the display region in a direction perpendicular to the horizontal portion of the light guide plate.

At least one embodiment of the present disclosure further provides a display device, and the display device comprises any one of the display panels provided by the embodiments of the present disclosure.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

Figure 1:
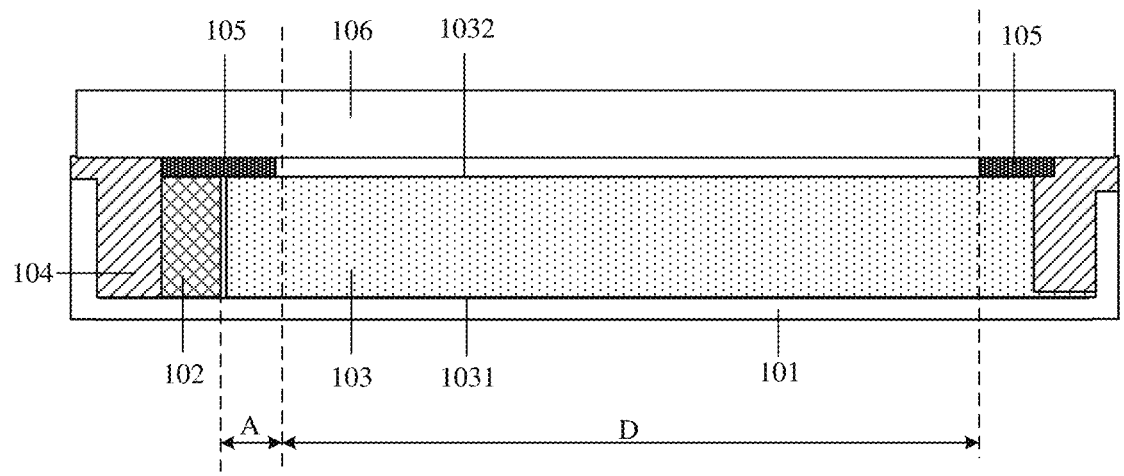
FIG. 1 is a structural schematic diagram of a display panel including a light source assembly.

101—back plate; 102—light emitting portion; 103—light guide plate; 104—mold frame; 105—light-shading tape; 106—display substrate; 1—light-entering surface; 2—bottom surface of the light guide plate; 20—inclined portion of the bottom surface; 21—horizontal portion of the bottom surface; 3—light-emitting surface of the light guide plate; 30—inclined portion of the light-emitting surface; 301—first inclined surface of the light-emitting surface; 302—second inclined surface of the light-emitting surface; 303—third inclined surface of the light-emitting surface; 31—horizontal portion of the light-emitting surface; 310—region easy with high brightness; 311—light absorption region; 312—middle region; 4—display region; 401—region easy with bright bands; 5—non-display region; 6—light-emitting portion; 601—base; 602—light-emitting element; 7—light adjustment structure; 8—mold frame; 9—back plate; 10—light guide plate; 11—light source assembly; 12—display substrate; 13—display panel; 14—display device; 15—reflection layer.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "Inside," "outside," "on," "under," and the like are only used to indicate relative position relationship, and when the position of the object which is described is changed, the relative position relationship may be changed accordingly.

The figures in embodiments of the present disclosure are not drawn according to actual proportions or scales. An amount of the plurality of serrated structures of the inclined portion of the light guide plate is not limited to the amount illustrated in the figures, specific sizes and amounts of all the structures are determined according to actual acquirements. The figures of the embodiments of the present disclosure are only schematic views.

FIG. 1 is a structural schematic diagram of a display panel. As illustrated in FIG. 1, the display panel comprises a light source assembly and a display substrate 106. The light source assembly comprises a back plate 101, a light emitting portion 102 on the back plate 101, a light guide plate 103 on the back plate 101, a mold frame 104 for fixing and protecting the light emitting portion 102, and a light-shading tape 105. A light-emitting surface of the light emitting portion 102 faces a light-entering surface of the light guide plate 103, thus light emitted by the light emitting portion 102 enters the light guide plate 103. The shielding-tape 105 covers the light emitting portion 102 and a portion, which is close to the light emitting portion 102, of the light guide plate 103. As illustrated in FIG. 1, a shape of a cross section of the light guide plate 103 is rectangular, and both a light-emitting surface, which faces the display substrate 106, of the light guide plate 103 and a bottom surface opposite to the light-emitting surface of the light guide plate 103 are planes parallel to the display substrate 106. The display panel comprises a display region D. The display substrate 106 is on the light source assembly; the light emitting portion 102 is at an outside of the display region D, and a distance between the light-emitting surface of the light emitting portion 102 and an edge, which is close to the light emitting portion 102, of the display region D is A. In general, during designing the backlight source assembly, it is required to consider the value of A. If the value of A is too small, brightness of the edge, close to the light emitting portion 102, of the display region D is too high, which results in uneven brightness of the display region D. For example, a frame of the display panel illustrated in FIG. 1 is narrow, the distance A between the light-emitting surface of the light emitting portion 102 and the edge, which is close to the light emitting portion 102, of the display region D is limited to a certain extent, so that the value of A tends to be smaller, thus the above mentioned defects occurs. However, increasing the value of A is not beneficial to achieving the narrow frame of the display panel.

At least one embodiment of the present disclosure provides a light guide plate, and the light guide plate comprises a light-emitting surface, a bottom surface opposite to the light-emitting surface and a light-entering surface intersecting with the light-emitting surface and the bottom surface; at least one of the light-emitting surface of the light guide plate and the bottom surface of the light guide plate comprises a horizontal portion and an inclined portion protruding out of a plane where the horizontal portion is located along a direction away from both of the light-emitting surface and the bottom surface; the inclined portion is at an end, which is close to the light-entering surface, of the light guide plate, and the inclined portion has an included angle with respect to the horizontal portion.

For example, along a direction from a position close to the light-entering surface of the light guide plate to a position away from the light-entering surface of the light guide plate, a vertical distance between the inclined portion and the plane where the horizontal portion is located decrease gradually.

For example, the horizontal portion is at a side, which is away from the light-entering surface of the light guide plate, of the inclined portion.

Figure 2A:
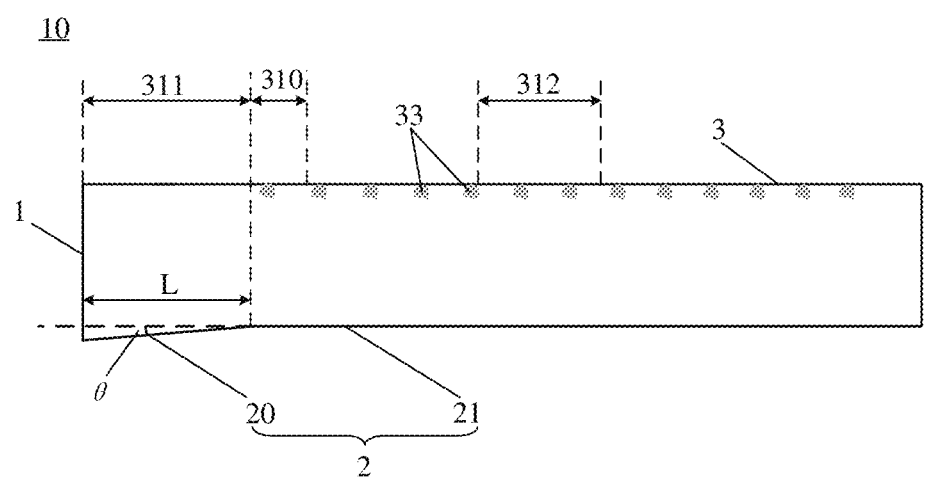
FIG. 2A is a structural schematic diagram one of a light guide plate provided by at least one embodiment of the present disclosure.

For example, the bottom surface opposite to the light-emitting surface comprises the horizontal portion and the inclined portion, and the light-emitting surface is parallel to the horizontal portion of the bottom surface. For example, FIG. 2A is structural schematic diagram one of the light guide plate provided by at least one embodiment of the present disclosure. As illustrated in FIG. 2A, the light guide plate 10 comprises a light-emitting surface 3, a bottom surface 2 opposite to the light-emitting surface 3 and a light-entering surface 1 intersecting with the light-emitting surface 3 and the bottom surface 2. The bottom surface 2 of the light guide plate 10 comprises a horizontal portion 21 and an inclined portion 20, and the inclined portion 20 protrudes out of a plane where the horizontal portion 21 is located along a direction away from both of the light-emitting surface 3 and the bottom surface 2. The inclined portion 20 is at an end, which is close to the light-entering surface 1, of the light guide plate 10, that is, the horizontal portion 21 is at a side, which is away from the light-entering surface 1 of the light guide plate 10, of the inclined portion 20 and no horizontal portion is between the inclined portion 20 and the light-entering surface 1 of the light guide plate 10. For example, in the embodiment illustrated in FIG. 2A, the inclined portion 20 of the bottom surface comprises one inclined surface, and the inclined surface has an included angle $\theta$ with respect to the horizontal portion 21. For example, the light-emitting surface 3 is parallel to the horizontal portion 21. During the light guide plate 10 works, light enters the light guide plate 10 through the light-entering surface 1; a part of the light is incident to the inclined portion 20 of the bottom surface, and then is reflected to the light-emitting surface 3 by the inclined portion 20 and is emitted through the light-emitting surface 3. Compared with the light guide plate illustrated in FIG. 1, the inclined portion 20 of the light guide plate 10 provided by at least one embodiment of the present disclosure reduces light emitted in a region easy with high brightness 310, thus brightness of the region easy with high brightness 310 is reduced, so that brightness of the region easy with high brightness 310 is same as or similar to brightness of regions (for example, a middle region 312) of the light-emitting surface other than the region easy with high brightness 310 and a light absorption region 311. Thus, the light guide plate provides light with uniform brightness, and for example, the light guide plate provides uniform backlight for a display panel.

Figure 2B:
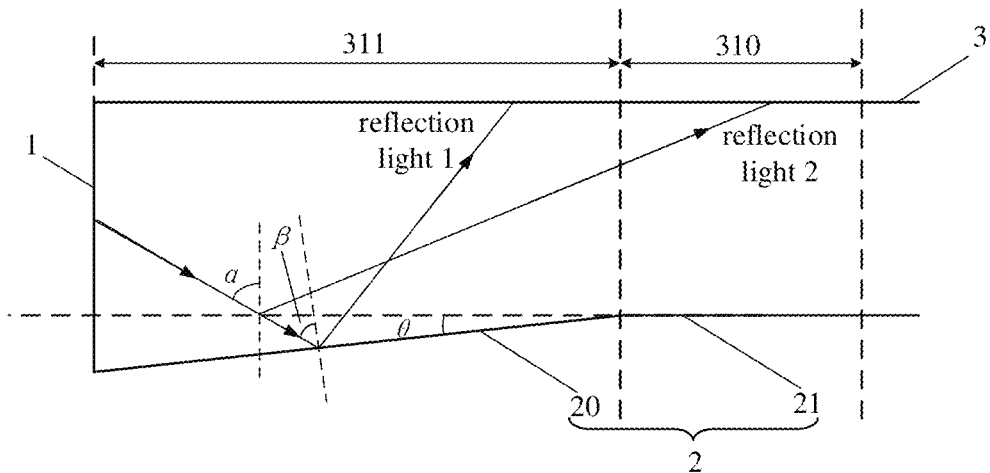
FIG. 2B is a schematic diagram of contrast of a light path of the light guide plate illustrated in FIG. 2A and a light path of the light guide plate illustrated in FIG. 1.

FIG. 2B is a schematic diagram of contrast of a light path of the light guide plate illustrated in FIG. 2A and a light path of the light guide plate illustrated in FIG. 1. As illustrated in FIG. 2B, during the light guide plate works, incident light from a light emitting portion enters the light guide plate 10 through the light-entering surface 1 of the light guide plate. In the light guide plate illustrated in FIG. 1, the incident light is incident to a horizontal bottom surface 1031 of the light guide plate, and an incident angle is a; according to the law of reflection, reflection light of the incident light is reflection light 2 illustrated in FIG. 2B. The reflection light 2 is emitted in the region easy with high brightness 310 of the light-emitting surface. A distance between the light emitting portion and the light-entering surface 1 of the light guide plate becomes smaller, then light with a greater incident angle increases, thus more light is emitted in the region easy with high brightness 310, which results that light provided by the light guide plate in the region easy with high brightness 310 possesses a high intensity, a bright band is formed in this region, and the brightness of the light provided by the guide plate is uneven. However, in the light guide plate 10 provided by the embodiment illustrated in FIG. 2A, the incident light is incident to the inclined surface of the inclined portion 20 of the bottom surface, the incident angle is β, and a corresponding reflection light 1 is illustrated in FIG. 2B. It is obvious that β<α. Therefore, the reflection light 1 is incident to a region (that is, the light absorption region 311), which is closer to the light-entering surface than the region easy with high brightness 310 of the light emitting surface, and is absorbed. For example, during an operation process of the light guide plate 10, the light absorption region 311 is covered by a light-shading tape or the like, so that the light incident on the light absorption region 311 of the light-emitting surface is eventually absorbed by the light-shading tape or the like. Therefore, compared with the light guide plate illustrated in FIG. 1, the light guide plate 10 provided by the embodiment illustrated in FIG. 2A reduces the light emitted in the region easy with high brightness 310, thus a phenomenon that the bright band occurs in the region easy with high brightness 310 is avoided or decreased, so that the light guide plate 10 provides light with uniform brightness. For example, an entirety of the inclined portion 20 is in the light absorption region 311.

For example, a value of the included angle θ is 1°~3°. If the angle θ is too large, a bending extent of a junction region between the inclined portion 20 of the bottom surface and the horizontal portion 21 of the bottom surface is too large, which causes a light leakage problem in the junction region. If the angle θ is too small, an extent of change of the above-mentioned incident angle is small, thus the effect of avoiding the phenomenon of the bright band is not obvious. It should be noted that in the light guide plate provided by at least one embodiment of the present disclosure, the value of the angle θ is not limited to the range 1°~3°, and the value range is just exemplary.

For example, as illustrated in FIG. 2A, a length L, along the direction from the position close to the light-entering surface 1 of the light guide plate to the position away from the light-entering surface 1, of the inclined surface of the bottom surface of the light guide plate is greater than 100 μm. Compared with an inclined surface with a length less than 100 μm, the inclined surface with the length more than 100 μm achieves a better effect of light adjustment.

For example, in the light guide plate 10 provided by at least one embodiment of the present disclosure, an anti-total reflection structure is provided on a side, which faces the bottom surface, of the light-emitting surface. Taking the light guide plate illustrated in FIG. 2A as an example, as illustrated in FIG. 2A, a plurality of anti-total reflection structures 33 are provided on the side, which faces the bottom surface 2, of the light-emitting surface 3. The plurality of anti-total reflection structures 33 are configured that light incident to the light-emitting surface 3 is emitted through the plurality of anti-total reflection structures 33. For example, the plurality of anti-total reflection structures 33 are grooves distributed as dots. The grooves are at the side, which faces the bottom surface, of the light-emitting surface 3, which changes the incident angle of the light incident to the light-emitting surface 3, conditions of a total reflection are destroyed, and thus at least a part of light incident to the grooves is emitted through the light-emitting surface 3. Alternatively, the plurality of anti-total reflection structures 33 are in other forms besides the grooves, for example, convex dots, light-picking gratings, etc., and no limitation is imposed to this in the embodiments of the present disclosure.

Figure 2C:
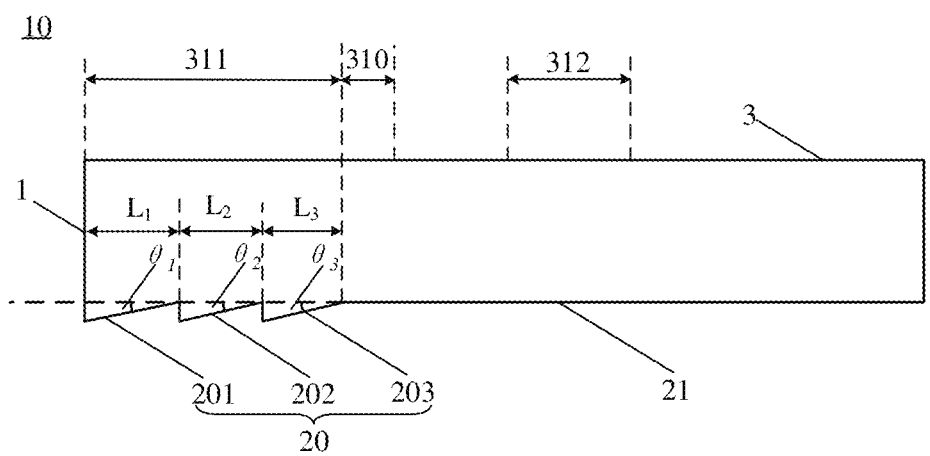
FIG. 2C is a structural schematic diagram two of the light guide plate provided by at least one embodiment of the present disclosure.

For example, in another embodiment of the present disclosure, the inclined portion of the bottom surface comprises a plurality of serrated structures, and each of the plurality of serrated structures comprises one inclined surface; included angles respectively between the inclined surfaces of the plurality of serrated structures and the horizontal portion of the bottom surface of the light guide plate are same with each other. For example, FIG. 2C is a structural schematic diagram two of the light guide plate provided by at least one embodiment of the present disclosure. For example, as illustrated in FIG. 2C, the difference between the light guide plate 10 and that illustrated in FIG. 2A is that the inclined portion 20 of the bottom surface comprises three serrated structures, and each of the three serrated structures comprises one inclined surface, that is, a first inclined surface 201, a second inclined 202 and a third inclined surface 203 are provided. The first inclined surface 201 has an included angle $\theta_1$ with respect to the horizontal portion 21 of the bottom surface of the light guide plate 10, the second inclined surface 202 has an included angle $\theta_2$ with respect to the horizontal portion 21 of the bottom surface of the light guide plate 10, and the third inclined surface 203 has an included angle $\theta_3$ with respect to the horizontal portion 21 of the bottom surface of the light guide plate 10. For example, in the embodiment illustrated in FIG. 2C, $\theta_1=\theta_2=\theta_3$, in this case, it is easy to manufacture the light guide plate. A principle of adjusting the incident light by the light guide plate 10 is similar to that of the light guide plate 10 illustrated in FIG. 2A, and the light guide plate 10 illustrated in FIG. 2C achieves an effect same as or better than that of the light guide plate 10 illustrated in FIG. 2A. Of course, in other embodiments of the present disclosure, the number of the serrated structures is not limited to three. Other structures not described of the light guide plate illustrated in FIG. 2C are all same as those illustrated in FIG. 2A, and the descriptions above may be referred to.

Figure 2D:
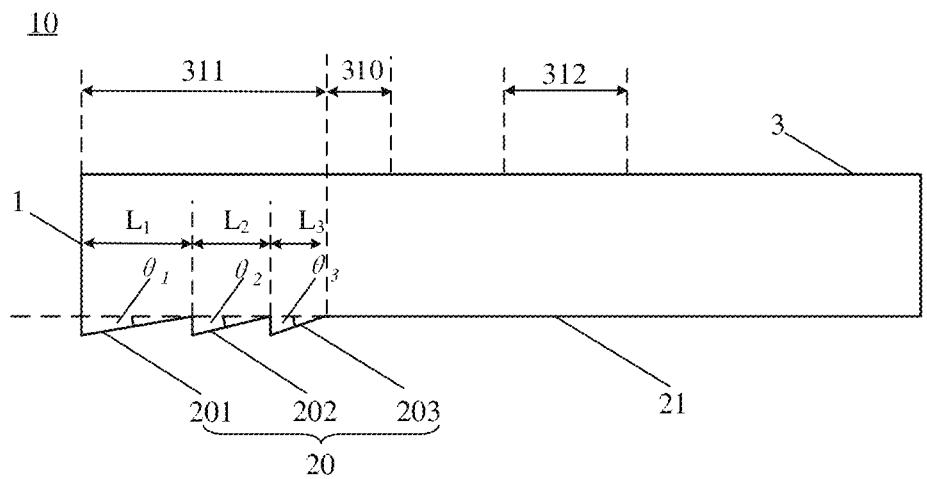
FIG. 2D is a structural schematic diagram three of the light guide plate provided by at least one embodiment of the present disclosure.

For example, in the light guide plate in further another embodiment of the present disclosure, the included angles respectively between the inclined surfaces of the plurality of serrated structures and the horizontal portion of the bottom surface of the light guide plate are different from each other. For example, FIG. 2D is a structural schematic diagram three of the light guide plate provided by at least one embodiment of the present disclosure. For example, as illustrated in FIG. 2D, the difference between the light guide plate 10 and that illustrated in FIG. 2C is that along the direction from the position close to the light-entering surface 1 of the light guide plate 10 to the position away from the light-entering surface 1 of the light guide plate 10, the included angles respectively between the inclined surfaces of the plurality of serrated structures and the horizontal portion 21 of the bottom surface increase gradually. That is, a relationship among the included angles $\theta_1$, $\theta_2$ and $\theta_3$ respectively formed by the first inclined surface 201 and the horizontal portion 21 of the bottom surface, the second inclined surface 202 and the horizontal portion 21 of the bottom surface, and the third inclined surface 203 and the horizontal portion 21 of the bottom surface is $\theta_1<\theta_2<\theta_3$. In this way, it is better for preventing light incident to the inclined surface away from the light-entering surface 1 with a larger incident angle from being emitted in the region easy with high brightness 310, thus the phenomenon of forming the bright band in the region easy with high brightness 310 is avoided or decreased, so that the light guide plate 10 provides light with uniform brightness. Of course, in other embodiments of the present disclosure, the number of the serrated structures is not limited to three. Other structures not described of the light guide plate illustrated in FIG. 2D are all same as those illustrated in FIG. 2A, and the descriptions above may be referred to.

For example, lengths, along the direction from the position close to the light-entering surface of the light guide plate to the position away from the light-entering surface of the light guide plate, of inclined surfaces of the plurality of serrated structures are same with each other. In FIG. 2C and FIG. 2D, lengths, along the direction from the position close to the light-entering surface 1 of the light guide plate to the position away from the light-entering surface 1 of the light guide plate, of the first inclined surface 201, the second inclined surface 202 and the third inclined surface 203 are respectively $L_1$, $L_2$ and $L_3$. For example, $L_1=L_2=L_3$. Of course, in other embodiments, the lengths, along the direction from the position close to the light-entering surface of the light guide plate to the position away from the light-entering surface of the light guide plate, of the inclined surfaces of the plurality of serrated structures may be different from each other. No limitation is imposed to this.

However, whether the lengths of the inclined surfaces of the plurality of serrated structures are the same or different, the length, along the direction from the position close to the light-entering surface 1 of the light guide plate to the position away from the light-entering surface 1, of the inclined surface of each of the plurality of serrated structures is greater than 100 μm, so that a better light adjustment effect is achieved.

Figure 2E:
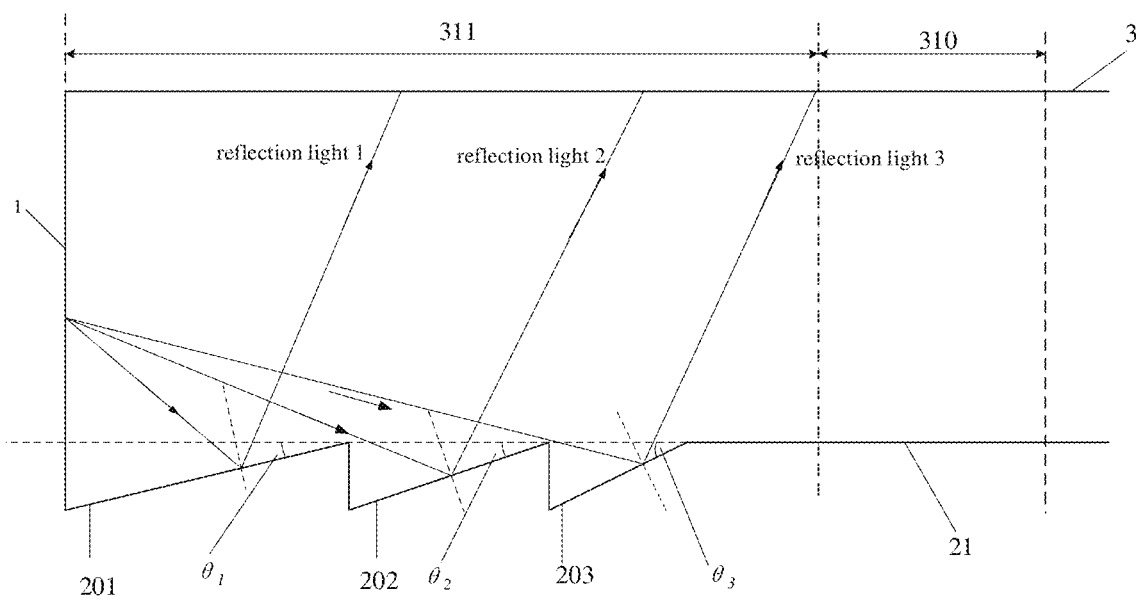
FIG. 2E is a schematic diagram of a light path of the light guide plate illustrated in FIG. 2D.

FIG. 2E is a schematic diagram of a light path of the light guide plate illustrated in FIG. 2D. As illustrated in FIG. 2E, during the light guide plate works, the incident light enters the light guide plate 10 through the light-entering surface 1 of the light guide plate. Taking a case where inclination degrees of the incident light respectively incident to the first inclined surface 201, the second inclined surface 202 and the third inclined surface 203 increase gradually (that is, the included angles between the incident light respectively incident to the first inclined surface 201, the second inclined surface 202 and the third inclined surface 203 and the horizontal portion 21 of the bottom surface decrease gradually) as an example. The incident light are respectively incident to the first inclined surface 201, the second inclined surface 202 and the third inclined surface 203 of the horizontal portion 21 of the bottom surface, the reflection light 1, the reflection light 2 and a reflection light 3 are reflection light respectively reflected by the first inclined surface 201, the second inclined surface 202 and the third inclined surface 203. Because $\theta_1<\theta_2<\theta_3$, it is beneficial for the reflection light corresponding to the incident light with a larger inclination degree to reach the light absorption region 311 of the light-emitting surface 3 and is absorbed, thus the light emitted in the region easy with high brightness 310 is reduced, and the phenomenon of forming the bright band in the region easy with high brightness 310 is avoided or decreased, so that the light guide plate 10 provides light with uniform brightness.

For example, $\theta_1$, $\theta_2$ and $\theta_3$ are all 1°~3°, so that the light leakage problem in the junction region between the inclined portion 20 of the bottom surface and the horizontal portion 21 of the bottom surface caused by the too large included angles is avoided. For example, $L_1$, $L_2$ and $L_3$ are all greater than 100 μm, so that a better light adjustment is achieved.

Figure 3A:
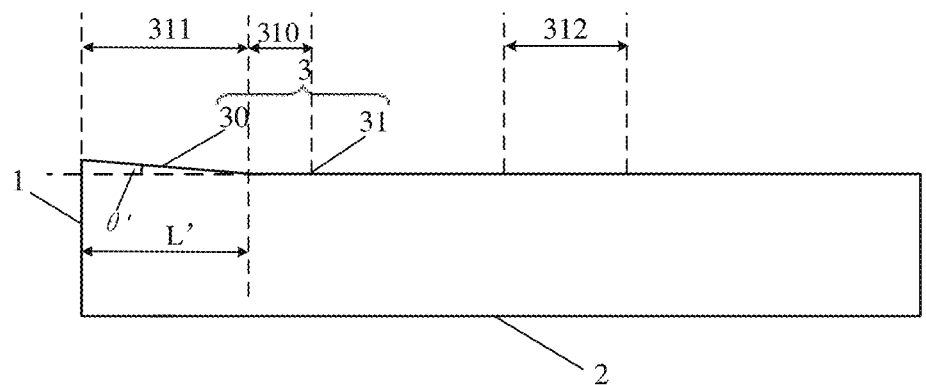
FIG. 3A is a structural schematic diagram four of the light guide plate provided by at least one embodiment of the present disclosure.

FIG. 3A is a structural schematic diagram four of the light guide plate provided by at least one embodiment of the present disclosure. The difference between the light guide plate 10 and that illustrated in FIG. 2A is that the light-emitting surface 3 of the light guide plate 10 comprises a horizontal portion 31 and an inclined portion 30 protruding out of the horizontal portion 21 along the direction away from both of the light-emitting surface 3 and the bottom surface 2; the inclined portion 30 comprises one inclined surface, and the inclined surface has an included angle θ' with respect to the horizontal portion 31, and the bottom surface 2 of the light guide plate 10 is parallel to the horizontal portion 31 of the light-emitting surface 3. Other structures not described of the light guide plate illustrated in FIG. 3A are all same as those illustrated in FIG. 2A, and the descriptions above may be referred to.

Figure 3B:
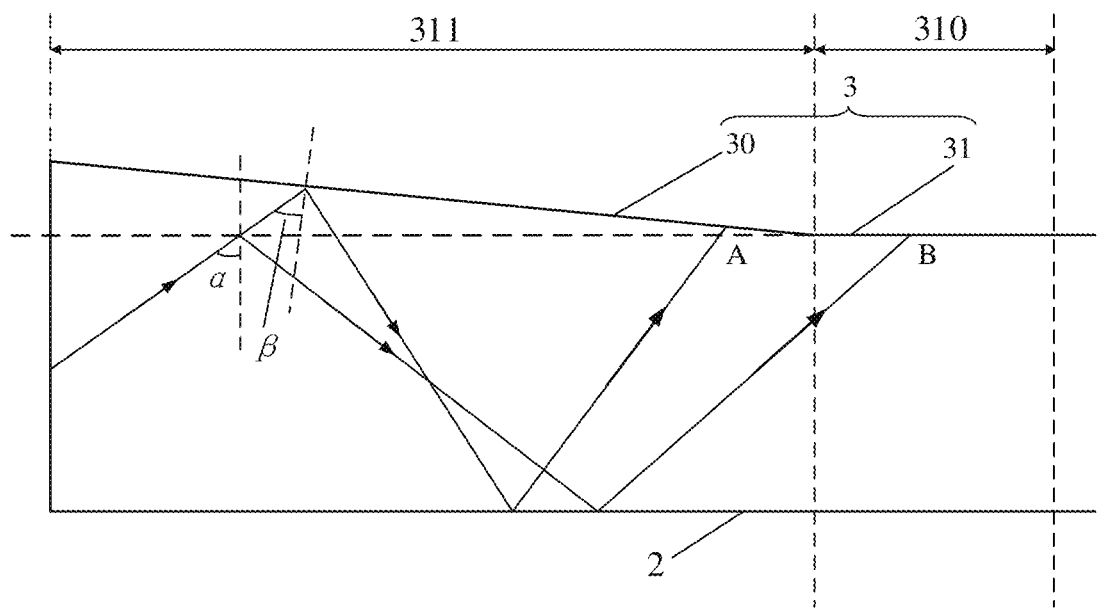
FIG. 3B is a schematic diagram of contrast of a light path of the light guide plate illustrated in FIG. 3A and the light path of the light guide plate illustrated in FIG. 1.

FIG. 3B is a schematic diagram of contrast of a light path of the light guide plate illustrated in FIG. 3A and the light path of the light guide plate illustrated in FIG. 1. As illustrated in FIG. 3B, during the light guide plate 10 illustrated in FIG. 3A works, the incident light enters the light guide plate 10 through the light-entering surface 1 of the light guide plate. In the light guide plate illustrated in FIG. 1, the incident light is incident to the light absorption region 311 of the horizontal light-emitting surface 1032 of the light guide plate, and the incident angle is a. Light satisfying conditions of total reflection is total reflected on the light-emitting surface 1032. According to the law of reflection, at least a part of light reflected by the light-emitting surface 1032 is incident to a position B of the light-emitting surface 3 after being reflected by the bottom surface 2 of the light guide plate and is emitted at the position B. The position B is in the region easy with high brightness 310, more such light emitted in the region easy with high brightness 310 causes a defect of the above-mentioned bright band. Light not reflected by the light-emitting surface 1032 is absorbed by the light-shading tape 105. However, in the light guide plate 10 provided by the embodiment illustrated in FIG. 3A, the incident light is incident to the inclined surface of the inclined portion 30 of the light-emitting surface, and the incident angle is β. It is obvious that β<α. Therefore, compared with the light guide plate illustrated in FIG. 1, on one hand, the inclined portion 30 reduces the incident angle so as to reduce the light satisfying the conditions of total reflection, thus the light reflected in the light absorption region 311 is reduced and more light is absorbed in the light absorption region 311; on the other hand, according to the law of reflection, at least a part of light reflected by the inclined portion 30 of the light-emitting surface is incident to a position A of the light-emitting surface 3 after being reflected by the bottom surface 2 of the light guide plate. The position A is in the light absorption region 311, that is, the position A is closer to the light-entering surface 1 than the position B. Therefore, compared with the light guide plate illustrated in FIG. 1, the light guide plate 10 provided by the embodiment illustrated in FIG. 3A reduces the light emitted in the region easy with high brightness 310, thus the phenomenon of forming the bright band in this region 310 is avoided or decreased, so that the light guide plate 10 provides light with uniform brightness. For example, the entirety of the inclined portion 30 is in the light absorption region 311.

For example, as illustrated in FIG. 3A, a length L', along the direction from the position close to the light-entering surface 1 of the light guide plate to the position away from the light-entering surface 1, of the inclined surface of the inclined portion 30 of the light-emitting surface is greater than 100 μm. Compared with an inclined surface with a length less than 100 μm, the inclined surface with the length more than 100 μm achieves a better effect of light adjustment.

Figure 3C:
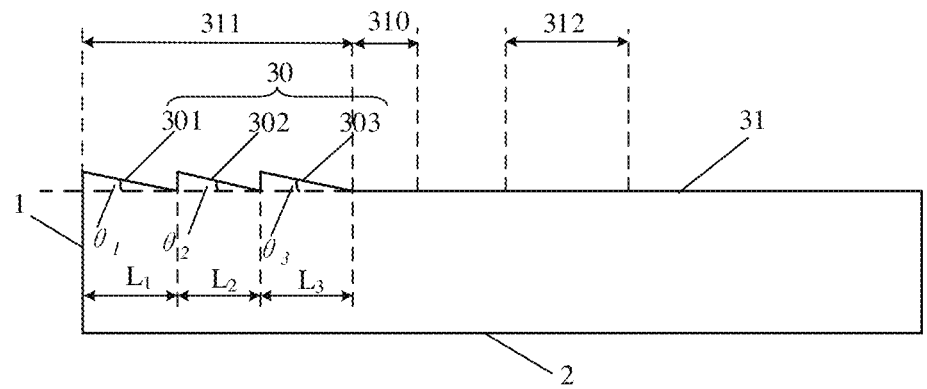
FIG. 3C is a structural schematic diagram five of the light guide plate provided by at least one embodiment of the present disclosure.

For example, in another embodiment of the present disclosure, the inclined portion of the light-emitting surface comprises a plurality of serrated structures, and each of the plurality of serrated structures comprises one inclined surface; included angles respectively between the inclined surfaces of the plurality of serrated structures and the horizontal portion of the light-emitting surface of the light guide plate are same with each other. For example, FIG. 3C is a structural schematic diagram five of the light guide plate provided by at least one embodiment of the present disclosure. As illustrated in FIG. 3C, the difference between the light guide plate 10 and that illustrated in FIG. 3A is that the inclined portion 30 of the light-emitting surface comprises three serrated structures, and each of the three serrated structures comprises one inclined surface, that is, a first inclined surface 301, a second inclined 302 and a third inclined surface 303 are provided. The first inclined surface 301 has an included angle $\theta_1$ with respect to the horizontal portion 31 of the light-emitting surface of the light guide plate 10, the second inclined surface 302 has an included angle $\theta_2$ with respect to the horizontal portion 31 of the light-emitting surface of the light guide plate 10, and the third inclined surface 303 has an included angle $\theta_3$ with respect to the horizontal portion 31 of the light-emitting surface of the light guide plate 10. For example, in the embodiment illustrated in FIG. 3C, $\theta_1=\theta_2=\theta_3$, in this case, it is easy to manufacture the light guide plate. A principle of adjusting the incident light by the light guide plate 10 is similar to that of the light guide plate 10 illustrated in FIG. 2A, and the light guide plate 10 illustrated in FIG. 3C achieves an effect same as or better than that of the light guide plate 10 illustrated in FIG. 3A. Of course, in other embodiments of the present disclosure, the number of the serrated structures is not limited to three. Other structures not described of the light guide plate illustrated in FIG. 3C are all same as those illustrated in FIG. 3A, and the descriptions above can be referred to.

Figure 3D:
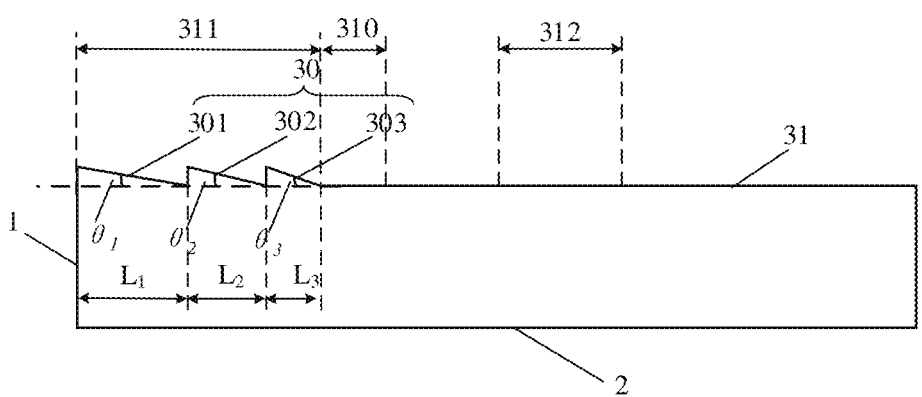
FIG. 3D is a structural schematic diagram six of the light guide plate provided by at least one embodiment of the present disclosure.

For example, in the light guide plate in further another embodiment of the present disclosure, the included angles respectively between the inclined surfaces of the plurality of serrated structures and the horizontal portion of the bottom surface of the light guide plate are different from each other. For example, FIG. 3D is a structural schematic diagram six of the light guide plate provided by at least one embodiment of the present disclosure. For example, as illustrated in FIG. 3D, the difference between the light guide plate 10 and that illustrated in FIG. 3C is that, along the direction from the position close to the light-entering surface 1 of the light guide plate 10 to the position away from the light-entering surface 1 of the light guide plate 10, the included angles respectively between the inclined surfaces of the plurality of serrated structures and the horizontal portion 31 of the bottom surface increase gradually. That is, a relationship among the included angles $\theta_1$, $\theta_2$ and $\theta_3$ respectively formed by the first inclined surface 301 and the horizontal portion 31 of the bottom surface, the second inclined surface 302 and the horizontal portion 31 of the bottom surface, and the third inclined surface 303 and the horizontal portion 31 of the bottom surface is $\theta_1<\theta_2<\theta_3$. Other structures not described of the light guide plate illustrated in FIG. 3D are all same as those illustrated in FIG. 3A, and the descriptions above may be referred to.

Figure 3E:
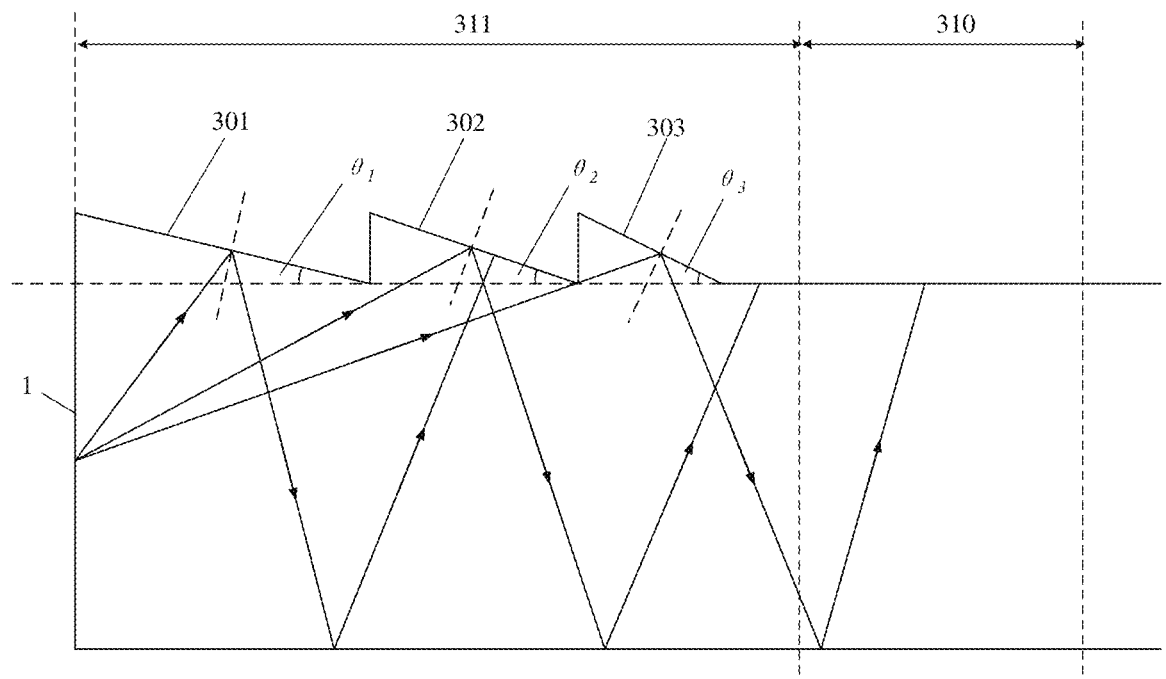
FIG. 3E is a schematic diagram of a light path of the light guide plate illustrated in FIG. 3D.

FIG. 3E is a schematic diagram of a light path of the light guide plate illustrated in FIG. 3D. In a case where the incident light has a same inclination degree, the larger the angle between the inclined surface and a plane where the horizontal portion 31 of the light-emitting surface is located, the smaller the incident angle of light incident on the inclined surface. In a case where $\theta_1<\theta_2<\theta_3$ and the incident light has the same inclination degree, on one hand, the light satisfying the conditions of total reflection on the first inclined surface 301, the light satisfying the conditions of total reflection on the second inclined surface 302 and the light satisfying the conditions of total reflection on the third inclined surface 30 decrease gradually, and the light absorbed on the first inclined surface 301, the light absorbed on the second inclined surface 302 and the light absorbed on the third inclined surface 303 increase gradually. It is easier for light reflected by the inclined surface far away from the light-entering surface 1 to be emitted in the region easy with high brightness 310; however, in a case where the values of the included angles are within a certain range and $\theta_1<\theta_2<\theta_3$, it is better to prevent the light incident on the inclined surface far away from the light-entering surface 1 from being emitted in the region easy with high brightness 310, thus the phenomenon of forming the bright band in this region 310 is better avoided or decreased, so that the light guide plate 10 provides light with uniform brightness. Of course, in other embodiments of the present disclosure, the number of the serrated structures of the light-emitting surface is not limited to three.

For example, $\theta_1$, $\theta_2$ and $\theta_3$ are all 1°~3°, so that the light leakage problem in the junction region between the inclined portion 30 of the light-emitting surface and the horizontal portion 31 of the light-emitting surface caused by the too large included angles is avoided. In FIG. 3C and FIG. 3D, lengths, along the direction from the position close to the light-entering surface 1 of the light guide plate to the position away from the light-entering surface 1 of the light guide plate, of the first inclined surface 301, the second inclined surface 302 and the third inclined surface 303 are respectively $L_1$, $L_2$ and $L_3$. For example, $L_1$, $L_2$ and $L_3$ are all greater than 100 μm, so that a better light adjustment is achieved.

Figure 4:
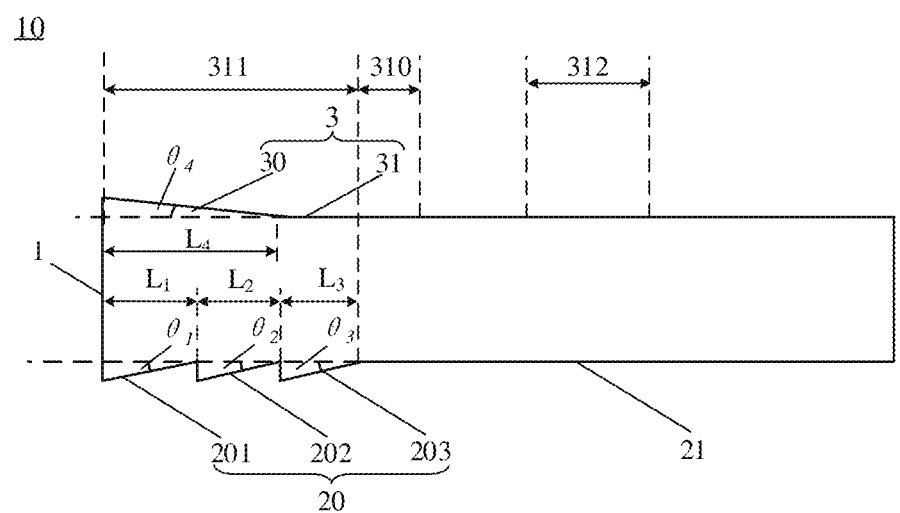
FIG. 4 is a structural schematic diagram seven of the light guide plate provided by at least one embodiment of the present disclosure.

In another embodiment of the present disclosure, both the light-entering surface of the light guide plate and the bottom surface of the light guide plate comprise the horizontal portion and the inclined portion, and the horizontal portion of the light-entering surface is parallel to the horizontal portion of the bottom surface. For example, the inclined portion of the bottom surface comprises a plurality of serrated structures, each of the plurality of serrated structures comprises one inclined surface, and each of the inclined surfaces has an included angle with respect to the horizontal portion of the bottom surface. For example, the included angles respectively between the inclined surfaces of the plurality of serrated structures and the horizontal portion of the bottom surface of the light guide plate are same with each other. For example, FIG. 4 is a structural schematic diagram seven of the light guide plate provided by at least one embodiment of the present disclosure. As illustrated in FIG. 4, the inclined portion 20 of the bottom surface comprises three serrated structures, and each of the three serrated structures comprises one inclined surface, that is, the first inclined surface 201, the second inclined 202 and the third inclined surface 203 are provided. The first inclined surface 201 has the included angle $\theta_1$ with respect to the horizontal portion 21 of the bottom surface of the light guide plate 10, the second inclined 202 has the included angle $\theta_2$ with respect to the horizontal portion 21 of the bottom surface of the light guide plate 10, and the third inclined surface 203 has the included angle $\theta_3$ with respect to the horizontal portion 21 of the bottom surface of the light guide plate 10. For example, $\theta_1=\theta_2=\theta_3$, in this case, it is easy to manufacture the light guide plate. Of course, in other embodiments of the present disclosure, for example, the included angles respectively between the inclined surfaces of the plurality of serrated structures and the horizontal portion of the bottom surface of the light guide plate are different from each other. For example, along the direction from the position close to the light-entering surface 1 of the light guide plate 10 to the position away from the light-entering surface 1 of the light guide plate 10, the included angles respectively between the inclined surfaces of the plurality of serrated structures and the horizontal portion 21 of the bottom surface increase gradually, that is $\theta_1<\theta_2<\theta_3$. In this way, it is better for preventing light incident to the inclined surface away from the light-entering surface 1 with a larger incident angle from being emitted in the region easy with high brightness 310, thus the phenomenon of forming the bright band in this region 310 is avoided or decreased, so that the light guide plate 10 provides light with uniform brightness. Of course, in other embodiments of the present disclosure, for example, the inclined portion of the bottom surface comprises one inclined surface; or the number of the serrated structures is not limited to three. As illustrated in FIG. 4, the light-emitting surface 3 of the light guide plate 10 comprises the horizontal portion 31 and the inclined portion 30 protruding out of the horizontal portion along the direction away from the light-emitting surface 3 and the bottom surface 2; the inclined portion 30 comprises one inclined surface, and the inclined surface has the included angle $\theta_4$ with respect to the plane where the horizontal portion 31 of the light-emitting surface is located. Both the light-emitting surface and the bottom surface provided by at least one embodiment of the present disclosure comprise the horizontal portion and the inclined portion, which further reduces the light emitted in the region easy with high brightness 310, thus the phenomenon of forming the bright band in this region 310 is avoided or decreased, so that the light guide plate 10 provides light with uniform brightness. The principle of achieving this effect may be referred to the above descriptions. Other structures not described of the light guide plate illustrated in FIG. 4 are all same as those illustrated in FIG. 2A, and the descriptions above may be referred to.

For example, $\theta_1$, $\theta_2$, $\theta_3$ and $\theta_4$ are all 1°~3°, so that the light leakage problem caused by the too large included angles is avoided, and the problem that the effect of decreasing the phenomenon of the bright band is not obvious is avoided. Lengths, along the direction from the position close to the light-entering surface 1 of the light guide plate to the position away from the light-entering surface 1 of the light guide plate, of the first inclined surface 201, the second inclined surface 202 and the third inclined surface 203 are respectively $L_1$, $L_2$ and $L_3$, and a length, along the direction from the position close to the light-entering surface 1 of the light guide plate to the position away from the light-entering surface 1 of the light guide plate, of the inclined portion 30 of the light-emitting surface is $L_4$. For example, $L_1$, $L_2$, $L_3$ and $L_4$ are all greater than 100 μm, so that a better light adjustment is achieved.

It should be noted that in other embodiments of the present disclosure, for example, the light-emitting surface comprises the plurality of serrated structures protruding out along the direction away from both of the light-emitting surface and the bottom surface, each of the plurality of serrated structures comprises one inclined surface, and each of the inclined surfaces has the included angle with respect to the horizontal portion of the light-emitting surface. The included angles respectively between the inclined surfaces of the plurality of serrated structures and the horizontal portion of the light-emitting surface of the light guide plate are same or different. In other embodiments of the present disclosure, for example, the bottom surface comprises one inclined surface, and the inclined surface has the included angle with respect to the horizontal portion of the bottom surface. That is, the embodiments illustrated in the figures are only exemplary, the embodiments of the present disclosure may be combined to obtain other embodiments.

Optical simulations are performed on the light guide plate illustrated in FIG. 1 and several light guide plates provided by the embodiments of the present disclosure. In an optical simulation process, two regions (i.e. region A and region B in Tables 1 and 2 below) of the region easy with high brightness of the light guide plate and one region (i.e. region C in Tables 1 and 2 below) of the middle region of the light guide plate are selected, and brightness of the three selected regions, in which a brightness of the middle region of the guide plate is represented by the brightness of region C. A ratio of the brightness of the region A to the brightness of the region C and a ratio of the brightness of the region B to the brightness of the region C are obtained respectively. An average of the ratio of the brightness of the region A to the brightness of the region C and the ratio of the brightness of the region B to the brightness of the region C is used as a ratio of brightness of the region easy with high brightness to the brightness of the middle region, which is used as an indication of the effect of solving the problem that the brightness of the region easy with high brightness is too high for the light guide plate. The closer to 100% the ratio of the brightness of the region easy with high brightness 310 to the brightness of the middle region 312, the more uniform the light provided by the light-emitting surface of the horizontal portion of the light guide plate.

Table 1 is a table of a result of the optical simulation of several examples of the light guide plates in which the bottom surface or the light-emitting surface comprises one inclined surface. It can be seen from Table 1, in a case where both the light-emitting surface and the bottom surface of the light guide plate are horizontal planes ($\theta=0$, $L=0$), that is, the light guide plate is the light guide plate illustrated in FIG. 1, the ratio of the brightness of the region easy with high brightness to the brightness of the middle region is 200.77%. In the embodiment illustrated in FIG. 2A, in a case where $\theta=1.5°$, L=2 mm or a case where $\theta=2°$, L=2 mm or a case where $\theta=1.5°$, L=1.5 mm, the ratio of the brightness of the region easy with high brightness to the brightness of the middle region is closer to 100% than 200.77%; in the embodiment illustrated in FIG. 3A, in a case where $\theta=1°$, $L'=1$ mm, the ratio of the brightness of the region easy with high brightness 310 to the brightness of the middle region is closer to 100% compared with 200.77%. Therefore, compared with the light guide plate illustrated in FIG. 1, all the light guide plates in these cases according to the embodiments of the disclosure decrease the phenomenon of forming the bright band in the region easy with high brightness and improve the uniformity of the light provided the light guide plates. In a case where θ=1.5°, L=0.03 mm (30 μm), the ratio of the brightness of the region easy with high brightness 310 to the brightness of the middle region is 201.35%. It can be seen that in a case where the length L of the inclined surface is less than 100 μm, the light guide plate has a certain decreasing effect on the bright band, but the decreasing effect is not obvious.

TABLE 1

Table one of result of optical simulation

| Included angle between the inclined surface of the bottom surface and the horizontal portion θ (°) | Included angle between the inclined surface of the light-emitting surface and the horizontal portion θ' (°) | Length of the inclined surface of the bottom surface L (mm) | Length of the inclined surface of the light-emitting surface L' (mm) | Brightness of region A/Brightness of region C (%) | Brightness of region B/Brightness of region C (%) | Brightness of the region easy with high brightness/ Brightness of the middle region (%) |
|---|---|---|---|---|---|---|
| 0 | 0 | 0 | 0 | 206.27 | 195.27 | 200.77 |
| 1.5 | 0 | 2 | 0 | 106.01 | 109.72 | 107.87 |
| 2 | 0 | 2 | 0 | 152.78 | 153.60 | 153.19 |
| 1.5 | 0 | 1.5 | 0 | 112.20 | 109.86 | 111.03 |
| 0 | 1 | 0 | 1 | 103.24 | 109.35 | 106.30 |
| 1.5 | 0 | 0.03 | 0 | 200.96 | 201.74 | 201.35 |

Figure 5A:
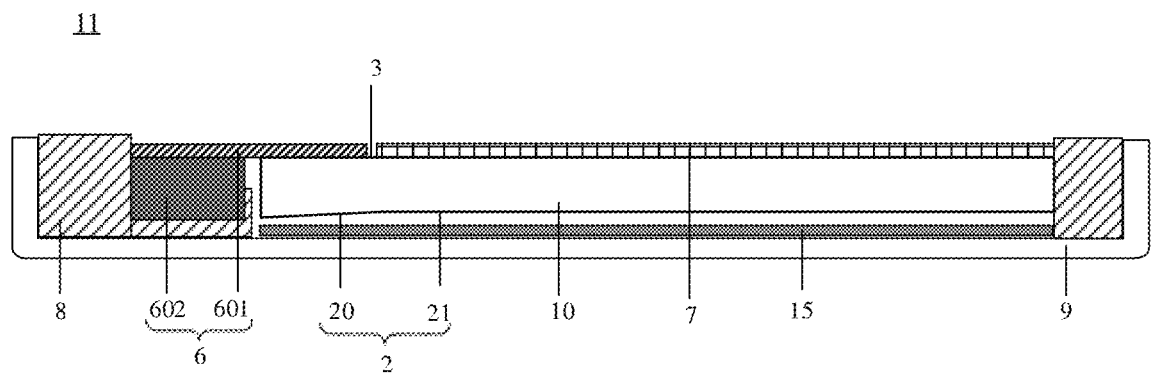
FIG. 5A is a structural schematic diagram of a light source assembly provided by at least one embodiment of the present disclosure.

Table 2 is a table of a result of the optical simulation of several examples of light guide plates in which the bottom surface or the light-emitting surface comprises the plurality of inclined surfaces. It can be seen from data in Table 2, in cases illustrated in Table 2, the ratios of the brightness of the region easy with high brightness to the brightness of the middle region are all closer to 100% than 200.77%. Therefore, compared with the light guide plate illustrated in FIG. 1, all the light guide plates in these cases decrease the phenomenon of forming the bright band in the region easy with high brightness and improve the uniformity of the light provided the light guide plates.

light source assembly 11 comprises any one of the light guide plates 10 provided by the embodiments of the present disclosure. It is illustrated in FIG. 5A by taking a case where the light source assembly 11 comprises the light guide plate illustrated in FIG. 2A as an example. For example, the light source assembly 11 further comprises a light-emitting portion 6, a mold frame 8 and a back plate 9. The light-emitting portion 6 faces the light-entering surface 1 of the light guide plate 10 so that light emitted by the light-emitting portion 6 enters the light-entering surface 1 of the light guide plate 10. The inclined portion 20 of the bottom surface of the light guide plate 10 is at a side, which is close to the light-emitting portion 6, of the horizontal portion 21 of the light guide plate 10. It should be noted that no horizontal portion is provided at a side, which is close to the light-emitting portion 6, of the inclined portion 20 of the bottom surface of the light guide plate 10. The light-emitting portion 6 and the light guide plate 10 are fixed on the back plate 9 of the light guide plate, and for example, the light-emitting portion 6 and the light guide plate 10 are fixed on the back plate 9 by a fixing tape.

TABLE 1

Table two of result of optical simulation

| Included angle θ1 (°) | Included angle θ2 (°) | Included angle θ3 (°) | Included angle θ4 (°) | Length L1 (mm) | Length L2 (mm) | Length L3 (mm) | Length L4 (mm) | Brightness of region A/Brightness of region C (%) | Brightness of region B/Brightness of region C (%) | Brightness of the region easy with high brightness/ Brightness of the middle region (%) |
|---|---|---|---|---|---|---|---|---|---|---|
| 0 | 0 | 0 | 0 | 0 | 0 | 0 | 0 | 206.27 | 195.27 | 200.77 |
| 1.5 | 1.5 | 1.5 | 0 | 0.27 | 0.27 | 0.27 | 0 | 130.76 | 126.76 | 128.76 |
| 1 | 1.5 | 2 | 1 | 0.27 | 0.27 | 0.27 | 1 | 78.19 | 75.08 | 153.27 |

At least one embodiment of the present disclosure provides a light source assembly, and the light source assembly comprises any one of the light guide plates provided by the embodiments of the present disclosure. For example, the light source assembly provided by at least one embodiment of the present disclosure is used as a backlight source, for example, the backlight source for a display device (for example, a liquid crystal display device, etc.) or a lighting device (for example, a lighting lamp or a decorative lamp), etc.

For example, FIG. 5A is a structural schematic diagram of the light source assembly provided by at least one embodiment of the present disclosure. As illustrated in FIG. 5A, a The mold frame 8 fixes and protects the components inside the mold frame 8, such as the light-emitting portion 6.

For example, the light-emitting portion 6 comprises a base 601 and a light-emitting element 602. The light-emitting element 602 is fixed on the base 601; a portion of the base 601 covers an end, which is close to the light-emitting portion 6, of the light-emitting surface 3 of the light guide plate 10. For example, light intensities around the light-emitting portion 6 and at the end, which is close to the light-emitting portion 6, of the light guide plate 10 are higher, it is required to provide a light-shading tape on the light-emitting portion 6 and the end, which is close to the light-emitting portion 6, of the light guide plate 10. In a case where the light source assembly 11 is applied to a display panel, the light-shading tape prevents brightness of positions of the display panel corresponding to the end, which is close to the light-emitting portion 6, of the light guide plate 10 from being too high. In the light source assembly provided by at least one embodiment of the present disclosure, for example, the base 601 itself is lightproof, and the lightproof base 601 covers the end, which is close to the light-emitting portion 6, of the light-emitting surface 3 of the light guide plate 10, that is, the light absorption region 311 of the light-emitting surface of the light guide plate in the above embodiments. Thus, the base 601 further has a function of shading light, in this way, the light-shading tape on the light-emitting portion 6 and the end, which is close to the light-emitting portion 6, of the light guide plate 10 is omitted to simplify the structure of the light source assembly and simplify an assembly process and save costs. For example, a material of the lightproof base 601 is a black material which has a strong ability of absorbing light. For example, the material of the lightproof base 601 is a resin material mixed with a black pigment. For example, the base 601 comprises a printed circuit board, and for example, the printed circuit board is lightproof. Of course, the material of the base 601 is not limited to the above listed types, as long as the material of the base 601 is lightproof.

For example, the light source assembly 11 further comprises a reflection layer 15, and the reflection layer 15 is at a side, which is close to the bottom surface 2, of the light guide plate 10, so that a part of the light emitted by the light-emitting portion 6 and/or a part of the light emitted through the bottom surface 2 of the light guide plate 10 are emitted through the light-emitting surface 3 of the light guide plate 10 after being reflected by the reflection layer 15, thus more light is emitted through the light-emitting surface 3 of the light guide plate 10, which is beneficial to improving a light utilization efficiency.

For example, the light source assembly 11 further comprises a light adjustment structure 7, and the light adjustment structure 7 is stacked on the light-emitting surface 3 of the light guide plate 10 and is configured to homogenize the light emitted from the light-emitting surface 3 of the light guide plate 10. For example, the light adjustment structure 7 is a scattering film or a brightening film. Those skilled in the art may choose according to actual needs, no limitation is imposed to this in the embodiments of the present disclosure.

Figure 5B:
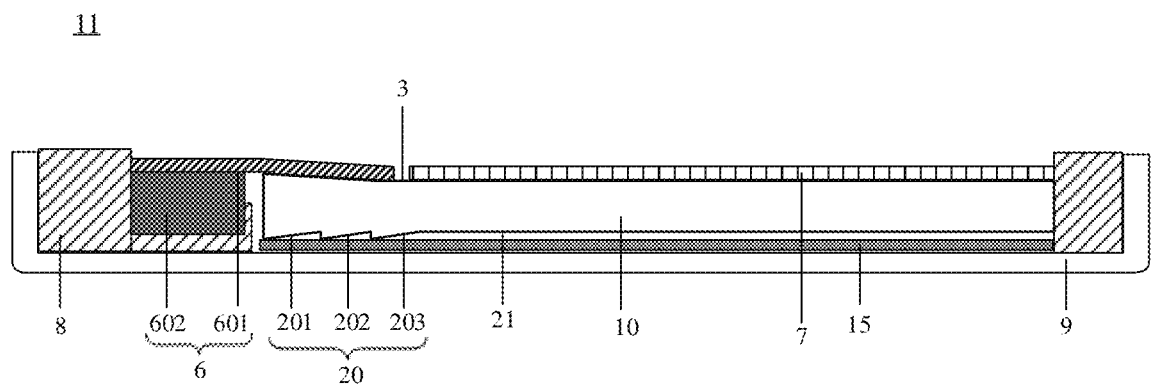
FIG. 5B is another structural schematic diagram of the light source assembly provided by at least one embodiment of the present disclosure.

FIG. 5B is a structural schematic diagram of another light source assembly provided by at least one embodiment of the present disclosure. It is illustrated in FIG. 5B taking a case where the light source assembly 11 comprises the light guide plate illustrated in FIG. 4 as an example. In the light guide plate 10, both the light-emitting surface 3 and the bottom surface 2 comprises the inclined portion. As illustrated in FIG. 5B, for example, the base 601 of the light-emitting portion 6 is a printed circuit board, and for example, the printed circuit board is a flexible circuit board, so that the base 601 is better attached to the inclined portion of the light-emitting surface 3 of light guide plate 10. Other structures of the light source assembly illustrated in FIG. 5B are all same as those illustrated in FIG. 5A, and no repetition is provided herein.

For example, in the light source assembly according to at least one embodiment of the present disclosure, the inclined portion is completely covered by the above-mentioned light-shading tape or the lightproof base.

Because the light source assembly provided by at least one embodiment of the present disclosure comprises any one of the light guide plates provided by the embodiments of the present disclosure, even though a distance between the light-emitting portion 6 and a display region is small, the brightness of the light emitted in the region easy with high brightness of the light-emitting surface of the light guide plate is reduced appropriately, thus the light guide plate provides light with uniform brightness. In this way, for example, the light source assembly provided in the present disclosure is better adapted to the display panel with a narrow frame, thus it is beneficial for the display panel to achieve uniform display brightness while achieving the narrow frame.

At least one embodiment of the present disclosure provides a display panel, and the display panel comprises any one of the light source assemblies provided by the embodiments of the present disclosure. The display panel may be any display panel requiring a backlight source, for example, a liquid crystal display panel. Because the display panel provided by at least one embodiment of the present disclosure comprises any one of the light source assemblies provided by the embodiments of the present disclosure, even though the distance between the light-emitting portion 6 and the display region is small, the brightness of the light emitted in the region easy with high brightness of the light-emitting surface of the light guide plate is reduced appropriately, thus the light guide plate provides light with uniform brightness. Therefore, the display panel provided in the present disclosure better serves as the display panel with the narrow frame, thus it is beneficial for the display panel to achieve uniform display brightness while achieving the narrow frame.

Figure 6:
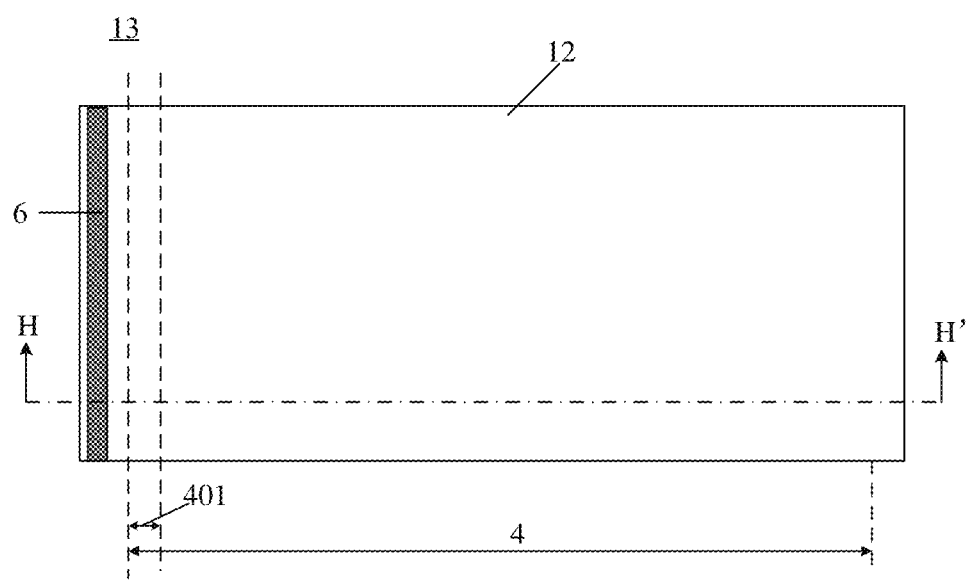
FIG. 6 is a structural schematic diagram of a display panel provided by at least one embodiment of the present disclosure.
Figure 7A:
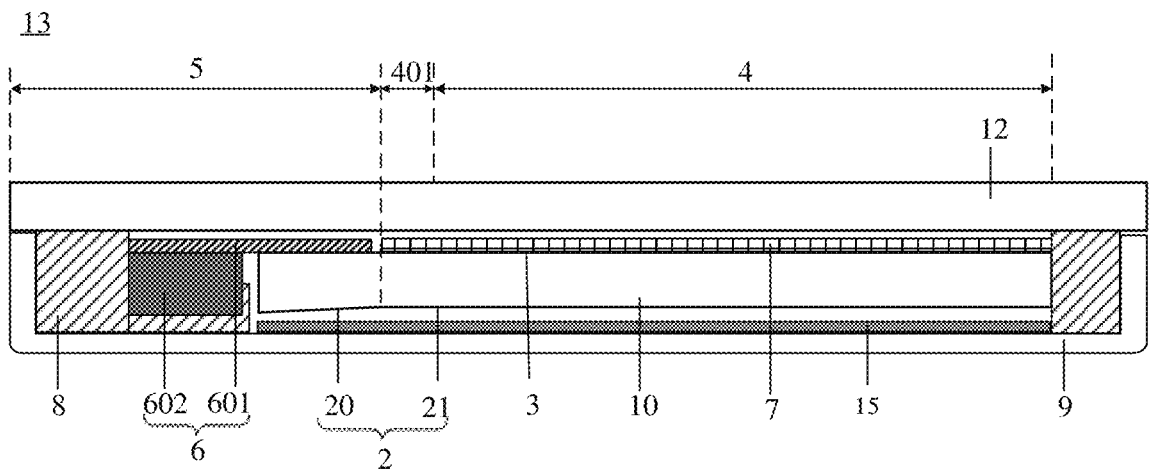
FIG. 7A is a cross-sectional schematic diagram taken along a line H-H' illustrated in FIG. 6.

For example, FIG. 6 is a structural schematic diagram of the display panel provided by at least one embodiment of the present disclosure, and FIG. 7A is a cross-sectional schematic diagram along a line H-H' illustrated in FIG. 6. As illustrated in FIG. 6, a display panel 13 comprises any one of the light source assemblies provided by the embodiments of the present disclosure. The display panel 13 in FIG. 7A is illustrated taking a case where the display panel 13 comprises the light source assembly illustrated in FIG. 5A as an example. As illustrated in FIG. 6 and FIG. 7A, the display panel 13 comprises a display substrate 12, and the display substrate 12 is on the light source assembly, and light emitted by the light-emitting surface of the light guide plate enters the display substrate 12 to be used for display. The display panel 13 comprises a display region 4 and a non-display region 5. The display region 4 comprises a region easy with bright bands 401 corresponding to the region easy with high brightness 310 of the light guide plate. If the brightness of the light from the region easy with high brightness 310 of the light guide plate is too high, a band with brightness higher than that of other positions of the display region 4 is formed in the region easy with bright bands 401 of the display panel, thus display brightness of the display panel is not uniform. The display panel provided by at least one embodiment of the present disclosure comprises any one of the light source assemblies provided by the embodiments of the present disclosure, thus the phenomenon of forming the bright band in the region easy with bright bands 401 is avoided and the uniform display brightness is provided.

For example, the inclined portion 20 of the bottom surface of the light guide plate 10 does not overlap the display region 4 in a direction perpendicular to the horizontal portion 21 of the light guide plate 10. Because the light emitted at the inclined portion 20 and the light emitted at the junction of the inclined portion 20 and the horizontal portion 21 are not uniform, a defect of uneven brightness of the display region caused by that both the inclined portion 20 and the junction of the inclined portion 20 and the horizontal portion 21 are in the display region 4 is avoided.

Figure 7B:
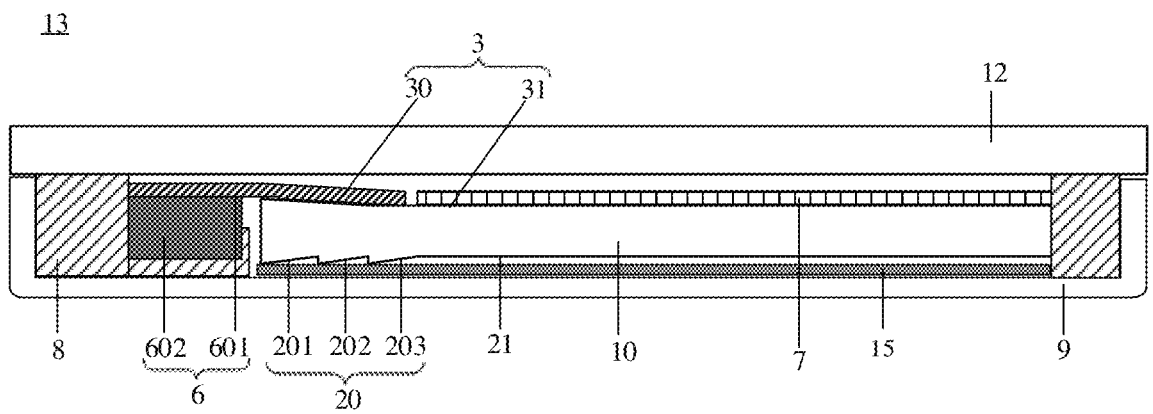
FIG. 7B is another cross-sectional schematic diagram taken along a line H-H' illustrated in FIG. 6.

FIG. 7B is another cross-sectional schematic diagram along a line H-H' illustrated in FIG. 6. In the light source assembly of the display panel 13 illustrated in FIG. 7B, both the light-emitting surface 3 of the light guide plate and the bottom surface 2 of the light guide plate comprises the inclined portion. Both the inclined portion 30 of the light-emitting surface and the inclined portion 20 of the bottom surface do not overlap the display region 4 in the direction perpendicular to the horizontal portion 21 of the bottom surface to avoid the defect of uneven brightness of the display region.

At least one embodiment of the present disclosure provides a display device, and the display device comprises any one of the display panels provided by the embodiments of the present disclosure.

Figure 8:
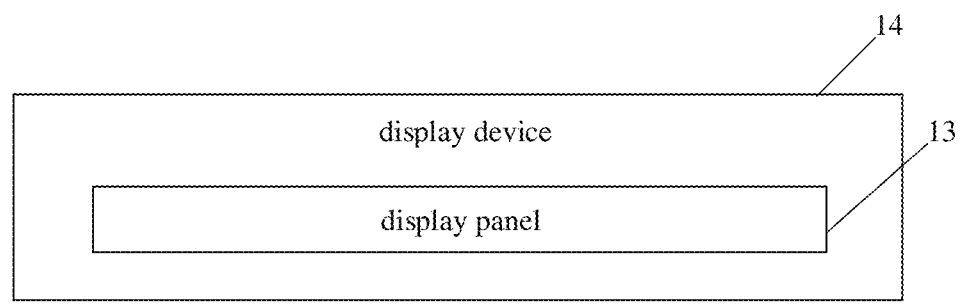
FIG. 8 is a schematic diagram of a display device provided by at least one embodiment of the present disclosure.

For example, FIG. 8 is a schematic diagram of a display device provided by at least one embodiment of the present disclosure. As illustrated in FIG. 8, a display device 14 comprises the display panel 13 provided by at least one embodiment of the present disclosure. For example, the display device may be any display device requiring a backlight source, for example, a liquid crystal display panel. For example, the display device can be products as follows: mobile phone, panel computer, TV set, display apparatus, laptop, digital photo frame, navigation instrument, electronic advertisement screen or the like.

What have been described above are only specific and exemplary implementations of the present disclosure, the protection scope of the present disclosure is not limited thereto. The protection scope of the present disclosure should be based on the protection scope of the claims.

What is claimed is:

1. A light guide plate, comprising: a light-emitting surface, a bottom surface opposite to the light-emitting surface and a light-entering surface intersecting with the light-emitting surface and the bottom surface, wherein,
    the light-emitting surface comprises a first horizontal portion and a first inclined portion protruding out of a plane where the first horizontal portion is located along a direction away from both of the light-emitting surface and the bottom surface; the bottom surface comprises a second horizontal portion and a second inclined portion protruding out of a plane where the second horizontal portion is located along a direction away from both of the light-emitting surface and the bottom surface; and the second horizontal portion of the bottom surface is parallel to the first horizontal portion of the light-emitting surface; the first inclined portion has a first included angle with respect to the first horizontal portion, and the second inclined portion has a second included angle with respect to the second horizontal portion;
    both the first inclined portion and the second inclined portion are at an end, which is close to the light-entering surface, of the light guide plate;
    no horizontal portion is between the first inclined portion and the light-entering surface, and no horizontal portion is between the second inclined portion and the light-entering surface.

2. The light guide plate according to claim 1, wherein, the second inclined portion of the bottom surface comprises one second inclined surface, and the second inclined surface has the second included angle with respect to the horizontal portion of the bottom surface.

3. The light guide plate according to claim 1, wherein, the second inclined portion of the bottom surface comprises a plurality of serrated structures, and each of the plurality of serrated structures comprises one second inclined surface;
    the second included angles respectively between the second inclined surfaces of the plurality of serrated structures and the second horizontal portion of the bottom surface of the light guide plate are same with each other.

4. The light guide plate according to claim 1, wherein, the second inclined portion of the bottom surface comprises a plurality of serrated structures, and each of the plurality of serrated structures comprises one second inclined surface; and
    along a direction from a position close to the light-entering surface of the light guide plate to a position away from the light-entering surface of the light guide plate, the second included angles respectively between the second inclined surfaces of the plurality of serrated structures and the second horizontal portion of the bottom surface increase gradually.

5. The light guide plate according to claim 1, wherein, the first inclined portion of the light-emitting surface comprises one first inclined surface, and the first inclined surface has the first included angel with respect to the first horizontal portion of the light-emitting surface.

6. The light guide plate according to claim 1, wherein, the first inclined portion of the light-emitting surface comprises a plurality of serrated structures, and each of the plurality of serrated structures comprises one first inclined surface;
    the first included angles respectively between the first inclined surfaces of the plurality of serrated structures and the first horizontal portion of the light-emitting surface are same with each other.

7. The light guide plate according to claim 1, wherein, the first inclined portion of the light-emitting surface comprises a plurality of serrated structures, and each of the plurality of serrated structures comprises one first inclined surface;
    along a direction from a position close to the light-entering surface of the light guide plate to a position away from the light-entering surface of the light guide plate, the first included angles respectively between the first inclined surfaces of the plurality of serrated structures and the first horizontal portion of the light-emitting surface of the light guide plate increase gradually.

8. The light guide plate according to claim 1, wherein, a value of the first included angle is 1°~3°, and a value of the second included angle is 1°~3°.

9. The light guide plate according to claim 1, wherein, a length, along a direction from a position close to the light-entering surface of the light guide plate to a position away from the light-entering surface of the light guide plate, of the first inclined surface is greater than 100 μm, and a length, along the direction from a position close to the light-entering surface of the light guide plate to a position away from the light-entering surface of the light guide plate, of the second inclined surface is greater than 100 μm.

10. The light guide plate according to claim 1, wherein, along a direction from a position close to the light-entering surface of the light guide plate to a position away from the light-entering surface of the light guide plate, a vertical distance between the first inclined portion and the plane where the first horizontal portion is located decrease gradually, and a vertical distance between the second inclined portion and the plane where the second horizontal portion is located decrease gradually.

11. The light guide plate according to claim 1, wherein, the first horizontal portion is at a side, which is away from the light-entering surface of the light guide plate, of the first inclined portion, and the second horizontal portion is at a side, which is away from the light-entering surface of the light guide plate, of the second inclined portion.

12. A light source assembly, comprising the light guide plate according to claim 1.

13. The light source assembly according to claim 12, further comprising:
   a light-emitting portion, facing the light-entering surface of the light guide plate so that light emitted by the light-emitting portion enters the light-entering surface of the light guide plate, wherein,
   the first inclined portion of the light guide plate is at a side, which is close to the light-emitting portion, of the first horizontal portion of the light guide plate, and the second inclined portion of the light guide plate is at a side, which is close to the light-emitting portion, of the second horizontal portion of the light guide plate.

14. The light source assembly according to claim 13, wherein,
   the light-emitting portion comprises a base and a light-emitting element, the light-emitting element is fixed on the base, a portion of the base covers an end, which is close to the light-emitting portion, of the light-emitting surface of the light guide plate, and the base is light-proof.

15. A display panel, comprising the light source assembly according to claim 10.

16. The display panel according to claim 15, further comprising a display region, wherein, both the first inclined portion and the second inclined portion of the light guide plate do not overlap the display region in a direction perpendicular to the horizontal portion of the light guide plate.

17. A display device, comprising the display panel according to claim 13.

* * * * *